United States Patent [19]
Hahnewald et al.

[11] Patent Number: 4,986,173
[45] Date of Patent: Jan. 22, 1991

[54] ELECTRIC BREAD TOASTER

[75] Inventors: Andrea Hahnewald, Egelsbach; Georg Möthrath, Gelnhausen; Stefan Schamberg, Oberursel; Volker Ullrich, Hanau, all of Fed. Rep. of Germany

[73] Assignee: Braun Aktiengesellschaft, Kronberg, Fed. Rep. of Germany

[21] Appl. No.: 399,912

[22] Filed: Aug. 29, 1989

[30] Foreign Application Priority Data

Sep. 9, 1988 [DE] Fed. Rep. of Germany ....... 3830632

[51] Int. Cl.⁵ .............................................. A47J 37/08
[52] U.S. Cl. ....................................... 99/338; 99/326; 99/331; 99/389; 99/400
[58] Field of Search ................. 99/326, 327, 331, 332, 99/334, 335, 385, 389, 391, 393, 400, 401, 386, 387, 337, 338, 329 RT; 219/385, 386, 391, 393

[56] References Cited
U.S. PATENT DOCUMENTS

| | | | |
|---|---|---|---|
| 1,961,667 | 3/1934 | Pavelka | 99/400 |
| 3,091,171 | 5/1963 | Cole | 99/400 |
| 4,185,546 | 1/1980 | Karpisek | 99/386 |
| 4,285,272 | 8/1981 | Klijnstra | 99/391 |
| 4,345,513 | 8/1982 | Holt | 99/327 |
| 4,345,515 | 8/1982 | Holt | 99/393 |
| 4,510,376 | 4/1985 | Schneider | 99/332 |
| 4,590,849 | 5/1986 | Uemura et al. | 99/331 |
| 4,647,758 | 3/1987 | Kelian | 219/385 |

FOREIGN PATENT DOCUMENTS 1272471 7/1968 Fed. Rep. of Germany .
2025525 12/1971 Fed. Rep. of Germany ........ 99/400

Primary Examiner—Timothy F. Simone
Attorney, Agent, or Firm—Fish & Richardson

[57] ABSTRACT

The invention is directed to a bread toaster with a removable crumb tray, including devices which prevent operation of the bread toaster when the crumb tray is not inserted and, secondly, which ensure that operation of the bread toaster is stopped when the crumb tray is removed during toasting.

10 Claims, 4 Drawing Sheets

ELECTRIC BREAD TOASTER

This invention relates to an electric bread toaster.

BACKGROUND OF THE INVENTION

Bread toasters of the type referred to which have no crumb collecting tray—hereinafter briefly referred to as crumb tray—are generally known in the art. Thus, for example, DE-AS 1,753,119 describes a bread toaster in which the article to be toasted, placed upright on a toast rack, can be moved into a toasting chamber which is enclosed by the toaster housing and accommodates an electric heating unit by means of a carriage which is capable of being lowered and raised. In this arrangement, the carriage can be moved to its lowermost position (toasting position) against the force of a spring by means of a handle, in which position the heating unit is energized and the carriage remains automatically locked in place for the duration of the toasting cycle. The duration of the toasting cycle can be controlled by a variety of mechanical devices (cf., for example, DE-OS 2,902,212) or, alternatively, b measuring the degree of browning of the article being toasted (cf. DE-PS 3,709,571). The toasting cycle is completed by the carriage being unlocked, thus enabling it to return to its uppermost position (receiving position) under the action of the spring, whereby the heating unit is again disconnected from its electrical supply.

A bread toaster of the type referred to with a crumb collecting tray is known, for example, from GB-2,117,627 A. In the bread toaster described in this specification, the shallow crumb tray arranged above the toaster base can be slid into the housing of the bread toaster and removed therefrom for emptying or cleaning either from the end wall or, alternatively, from a side wall thereof. To secure the crumb tray in its end position when inserted, sliding surfaces are provided within the housing of the bread toaster to receive the longitudinal sides of the substantially rectangular crumb tray, in addition to elastic locking projections provided on one of its two narrow sides which engage into corresponding slots formed in the housing of the bread toaster when the crumb tray is in its end position.

While the crumb tray is thereby secured against inadvertent sliding out of the housing of the bread toaster, this arrangement allows operation of the bread toaster also when the crumb tray is not inserted. Irrespective of whether the crumb tray is insertable from one of the two narrow sides or one of the two longitudinal sides of the bread toaster, the risk of electrical shock is increased in the known bread toaster when used without the crumb tray inserted.

The reason for this is that with the crumb tray removed, access to current-carrying parts is also possible from the underside of the housing, in addition to the fact that in such bread toasters access to non-insulated electric components from the upper side of the housing through the receiving slots is only avoidable to a limited degree. Even if the risk of touching live parts can be reduced by the provision of grids on the underside intermediate the toasting chamber and the crumb tray, with the grids being spaced such as to allow the crumbs to fall through but not the fingers to reach through, protection against electrical hazards is not ensured, especially for children and in particular if they handle tools such as screw drivers or the like.

Further, it is to be considered that heat may be dissipated through the additional opening in the bottom area of the bread toaster when in operation. In combination with the flow ratios within the toasting chamber which are likewise altered thereby, this affects the toasting result which is consequently no longer adjustable and predictable. Moreover, the emitted heat may damage or even deform plastic parts in the bottom area of the bread toaster as well as the surface on which the toaster stands.

In electric bread toasters having a what is referred to as an integrated cooling system in which the air cooling the side walls of the bread toaster is supplied to the toasting chamber (cf. DE-OS 3,516,553), the absence of a crumb tray further significantly impairs the path of the cooling air stream and the cooling effect as a whole due to the large additional opening produced at the bottom of the housing, which may result in local overheating of housing parts.

SUMMARY OF THE INVENTION

It is, therefore, an object of the present invention to devise a bread toaster with crumb tray in which, also with the crumb tray not inserted, the user is largely prevented from reaching non-insulated live parts from the underside of the bread toaster, in which the surface on which the bread toaster stands is not affected during operation, and in which, provided that the toaster is equipped with an integrated cooling system, local overheating heating of the housing is largely avoided.

The bread toaster of the invention affords the advantage of combining the merits of a crumb tray, such as the ease of cleaning of its housing interior and the removal of crumbs which otherwise become an odorous annoyance because of their charring, with the merits of bread toasters having no crumb tray. Because the bread toaster of the invention cannot be operated unless the crumb tray is fully inserted to its end position, the user of the bread toaster is largely protected against contacting non-insulated live parts. Furthermore, the surface on which the bread toaster stands remains largely unaffected during operation. Finally, in bread toasters having an integrated cooling system overheating of housing parts is largely prevented by the invention.

In a particularly advantageous embodiment of the bread toaster of the invention, a second device is provided which ensures that the carriage cannot be locked in its operating position when the crumb tray is removed or not fully inserted to its end position. This obviates a further possibility of faulty operation of a bread toaster equipped with a crumb tray, that is, the removal of the fully inserted crumb tray during the toasting cycle. The second device advantageously provides for premature interruption of the toasting cycle when the crumb tray is removed from its end position. This makes it nearly impossible for the user to reach non-insulated live parts from the underside of the bread toaster.

In addition, this advantageous embodiment of the invention makes it almost impossible for the surface on which the bread toaster stands to be affected during toasting and for bread toasters having an integrated cooling system to experience local overheating of the housing.

In an embodiment of the bread toaster of the invention, it can be accomplished with already very low-cost mechanical means that the toaster is prevented from operating when the crumb tray is removed or is not fully inserted to its end position.

A first device for preventing operation of the bread toaster when the crumb tray is removed or is not fully inserted to its end position, which device is particularly simple and accordingly low-cost while still functioning properly, is provided by configuring the slide member and the crumb tray.

In a bread toaster, the locking means which is necessary anyway has been extended by few additional mechanical parts affording ease of arrangement, such that considerable advantages result over bread toasters with crumb tray known from the prior art. It is to be noted that under no circumstances can the bread toaster of the invention be operated when the crumb tray is removed or not fully inserted to its end position.

The bread toaster results in an extremely straightforward and accordingly low-cost manner in which mechanical means are used first to prevent it from operating unless the crumb tray is fully inserted to its end position, and second to interrupt the toasting cycle automatically after it has started when the crumb tray is removed from its end position.

A further advantageous embodiment of the bread toaster of the invention which equally prevents it from operating by all means when the crumb tray is removed or not fully inserted to its end position.

The embodiment of the invention advantageously combines the advantages of an electrical control means, which are the high operational reliability and the low space requirements, with the advantage of a mechanical control means, which is the low financial expenditure.

If in a bread toaster both the crumb tray and the slide member are configured, a bread toaster results whose first and second device for preventing it from operating when the crumb tray is not fully inserted to its end position and, respectively, for interrupting the toasting cycle when the crumb tray is removed, are configured in an extremely straightforward, yet functionally reliable fashion.

Finally, a bread toaster configured has the advantage that its heating unit is not connected to the electrical power supply with the crumb tray removed or not fully inserted to its end position, even if the user of the bread toaster holds the carriage in operating position by means of the handle in opposition to the force of the spring acting on the carriage.

The invention will be described in more detail in the following with reference to the accompanying drawings. In the drawings showing only schematically the parts essential to the invention,

DESCRIPTION OF PARTICULAR EMBODIMENTS

Figure 1:
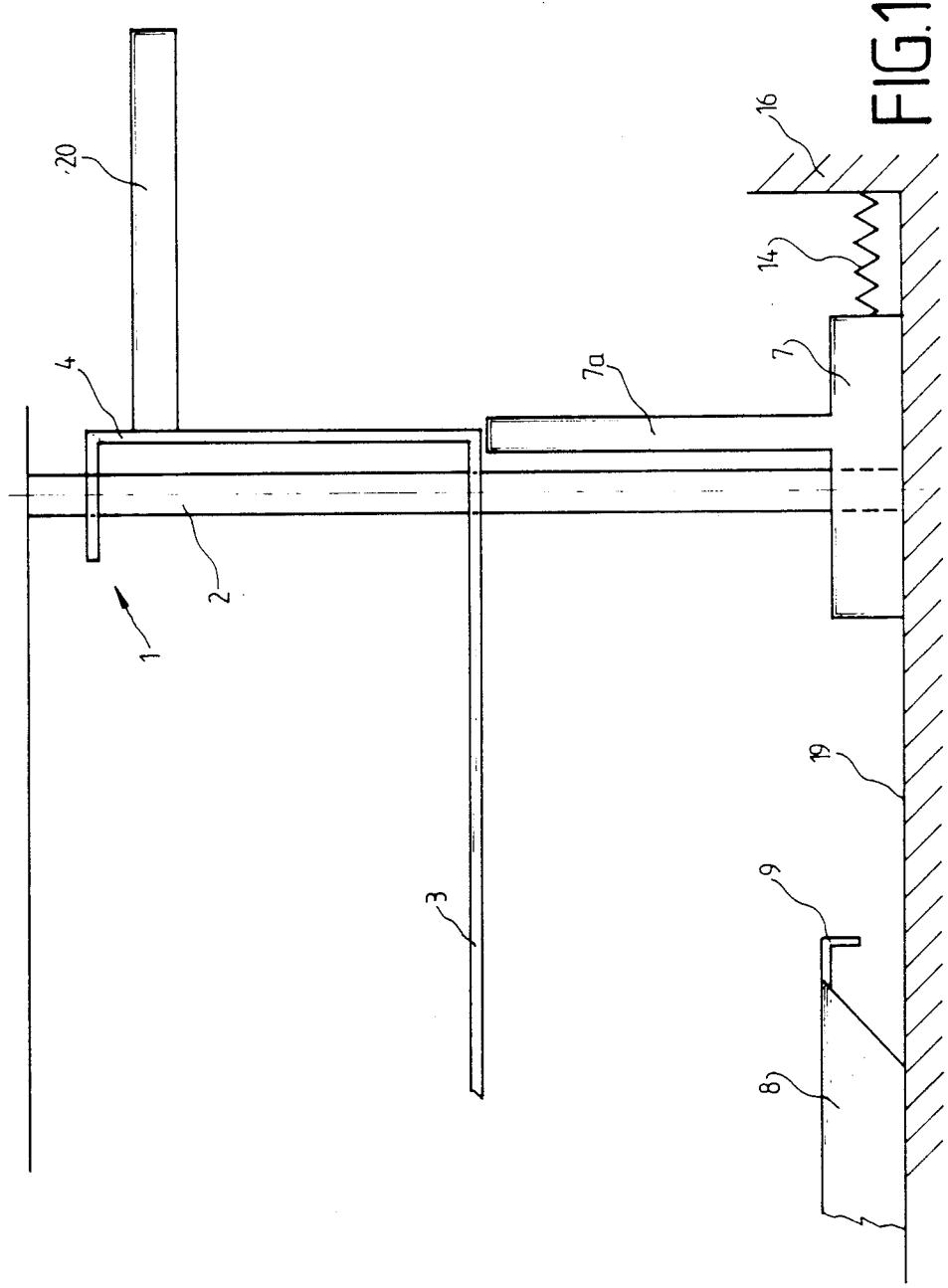
FIG. 1 is a view of a first embodiment of the bread toaster of the invention.

Referring now to FIG. 1, there is shown in a toasting chamber of a bread toaster a carriage 1 which is movable in a guideway 2 from a receiving position to an operating position and includes a toast rack 3 adapted to receive an article to be toasted in the toasting chamber. In this chamber it is toasted by an electric heating unit not shown. For this purpose, the toast rack 3 is lowered in a known manner against the action of a spring by means of a handle portion 20 guided in the end wall of the toaster housing and formed on a bracket 4 of the carriage 1.

When the carriage 1 has reached its operating position, it closes a switch not shown in known fashion, whereby electrical energy is supplied to the heating unit. The carriage 1 is held in this position by a locking mechanism likewise not shown in FIG. 1, returning to its receiving position under spring action on completion of the toasting cycle.

The bread toaster includes at the bottom of its housing a slide member 7 which is displaceable in horizontal direction against the action of a spring 14 disposed between a housing wall 16 of the bread toaster and the slide member itself, the slide member being also guided through the guideway 2 in a manner not shown. A crumb tray 8 which is equally insertable alongside the bottom of the bread toaster has an elbow section 9 formed thereon which cooperates with the slide member 7 shortly before the crumb tray 8 being inserted reaches its end position. In its end position in which the crumb tray 8 is in a position to catch all crumbs dropping from the toasting chamber, it is locked in place by means not described in further detail.

Integrally formed with the slide member 7 is a vertically extending projection 7a which comes to rest against the underside of the bracket 4 of the carriage 1 as a result of the action of the spring 14 when the crumb tray 8 is removed or not fully inserted to its end position. In this manner, the carriage is prevented from reaching its operating position when the crumb tray 8 is not in its end position, in which event the heating unit of the bread toaster is not supplied with electrical energy, accordingly preventing operation of the bread toaster.

When the crumb tray 8 is inserted alongside the bottom of the bread toaster up to its end position and locked in place by the means not shown, the vertically extending projection 7a of the slide member 7 is beyond the path of movement of the bracket 4, enabling the carriage 1 to be brought to its lowermost position in which it is locked for the duration of the toasting cycle by means likewise not shown.

In this manner it is ensured that the heating unit and thus the bread toaster cannot be operated until the crumb tray 8 is fully inserted to its end position.

By contrast, when the carriage 1 is already in its operating position and the crumb tray 8 is subsequently removed from its end position, the bread toaster continues to operate. Thus, a bread toaster according to the embodiment of FIG. 1 of the invention is safeguarded against operation only when the crumb tray 8 is not fully inserted to its end position.

Figure 2:
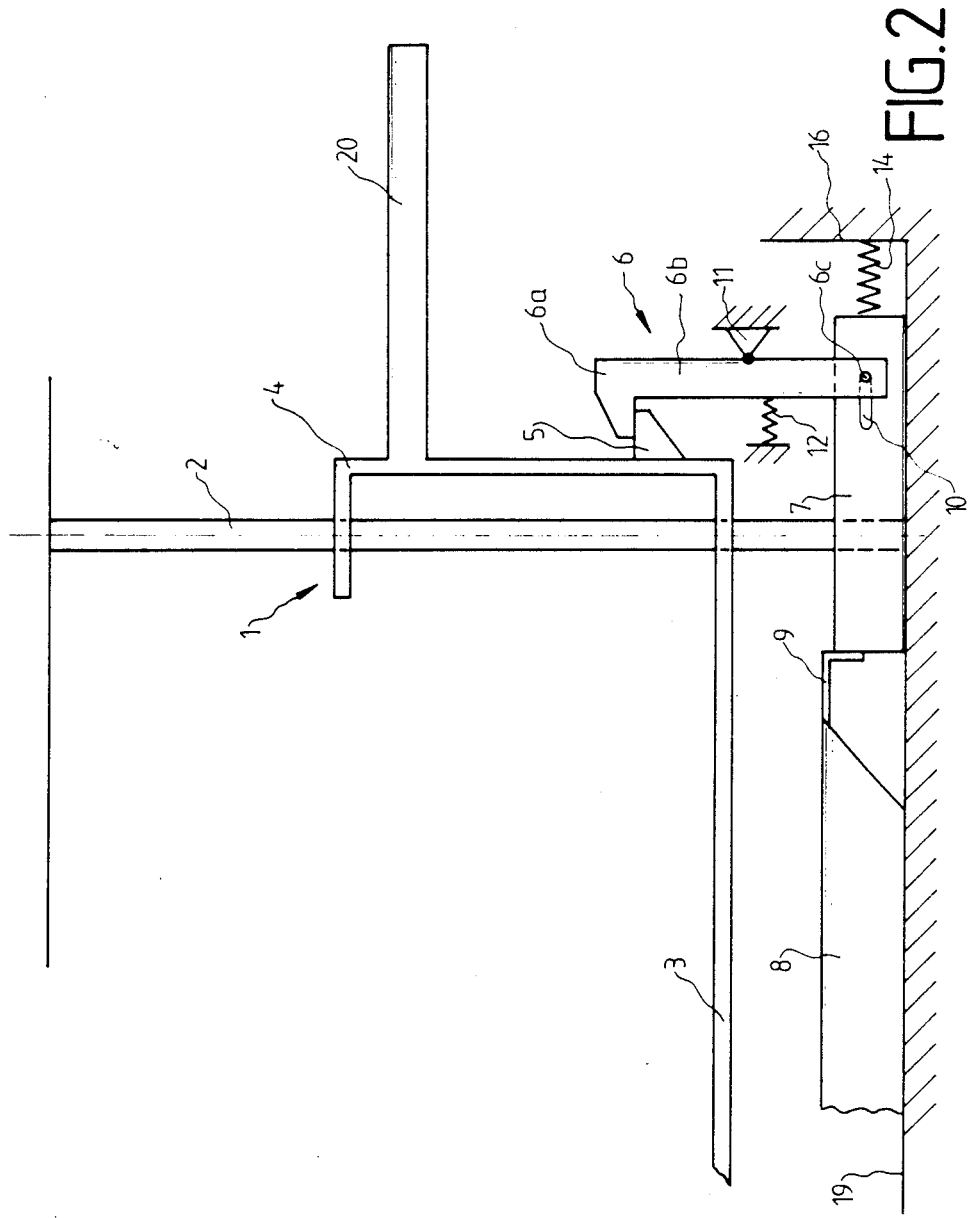
FIG. 2 is a view of a second embodiment of the bread toaster of the invention.

The bread toaster according to the embodiment of FIG. 2 includes likewise a carriage 1 with a toast rack 3, a bracket 4 and a handle portion 20 formed thereon. Again, the carriage 1 is guided through the guideway 2 as it is moved from its receiving to its operating position. In this embodiment, too, the article is toasted by moving the carriage 1 to its lowermost position where it is locked in place for the duration of the toasting cycle causing the heating unit to be energized.

The locking action is accomplished by means of a locking mechanism comprised of a detent nose 5 formed on the bracket 4 of the carriage 1, and of a pivoted lever 6 which is adapted to pivot about a pivot point 11 parallel to the plane of motion of the carriage 1 and has at its one end a hook member 6a and at its other end a trunnion 6c. In addition, the pivoted lever 6 is exposed to the action of a first spring 12 acting in horizontal direction below the pivot point 11. The trunnion 6c of the lever 6 is carried in an elongated hole 10 provided in a slide member 7 which is again horizontally movable alongside the bottom of the bread toaster housing.

Assuming that the slide member 7 maintains the position shown in FIG. 2, locking of the carriage 1 in operating position is accomplished by the detent nose 5 sliding alongside a bevel formed on the hook member 6a, thereby displacing the pivoted lever 6 clockwise. When the carriage 1 and thus the detent nose 5 are moved downwardly by the handle portion 20 until the upper boundary of the detent nose 5 is below the lower boundary of the hook member 6a, the pivoted lever 6, under the action of the spring 12, falls back into its position shown in FIG. 2, thereby locking the carriage 1 in its operating position. In this position, the heating unit is connected to the electrical supply causing the bread toaster to operate until the pivoted lever 6 is displaced clockwise by means not shown in FIG. 2, for example, a bimetallic strip, so that the carriage 1 returns to its receiving position assisted by the force of the spring. As a result, the heating unit of the bread toaster is again disconnected from its source of power, stopping operation of the bread toaster.

The slide member 7 which may be likewise guided through the guideway 2 is allowed to assume its position shown in FIG. 2 only because it is held in this position against the force of the spring 14 by an elbow section formed on the crumb tray 8. The position of the crumb tray 8 shown in FIG. 2 corresponds to its end position.

With the crumb tray 8 not inserted, the following relationships apply:

The force constant of the spring 14 is coordinated with the force constant of the spring 12 such that, with the crumb tray 8 not inserted, the torque acting clockwise from the spring 14 to the pivoted lever 6 via the slide member 7 and the trunnion 6c carried in its elongated hole 10 is greater than the torque produced by the spring 12 in counterclockwise direction. Accordingly, with the crumb tray 8 removed, the pivoted lever 6 is invariably in a position in which its hook member 6a is prevented from cooperating with the detent nose 5 of the carriage 1. For this reason, the locking mechanism can no longer come into effect, that is, the carriage 1 of the bread toaster can no longer be locked in its operating position, preventing continuous operation of the bread toaster, that is, the heating unit remains connected to its source of power only as long as the user holds the handle portion 20 in the lowermost position.

When the carriage 1 is already locked in its operating position so that the bread toaster is already in operation and if the crumb tray 8 is then removed, the pivoted lever 6 will turn clockwise as a result of its coupling with the slide member 7, causing the carriage 1 to be unlocked because its detent nose 5 is no longer in engagement with the underside of the hook member 6a of the pivoted lever 6.

Figure 3:
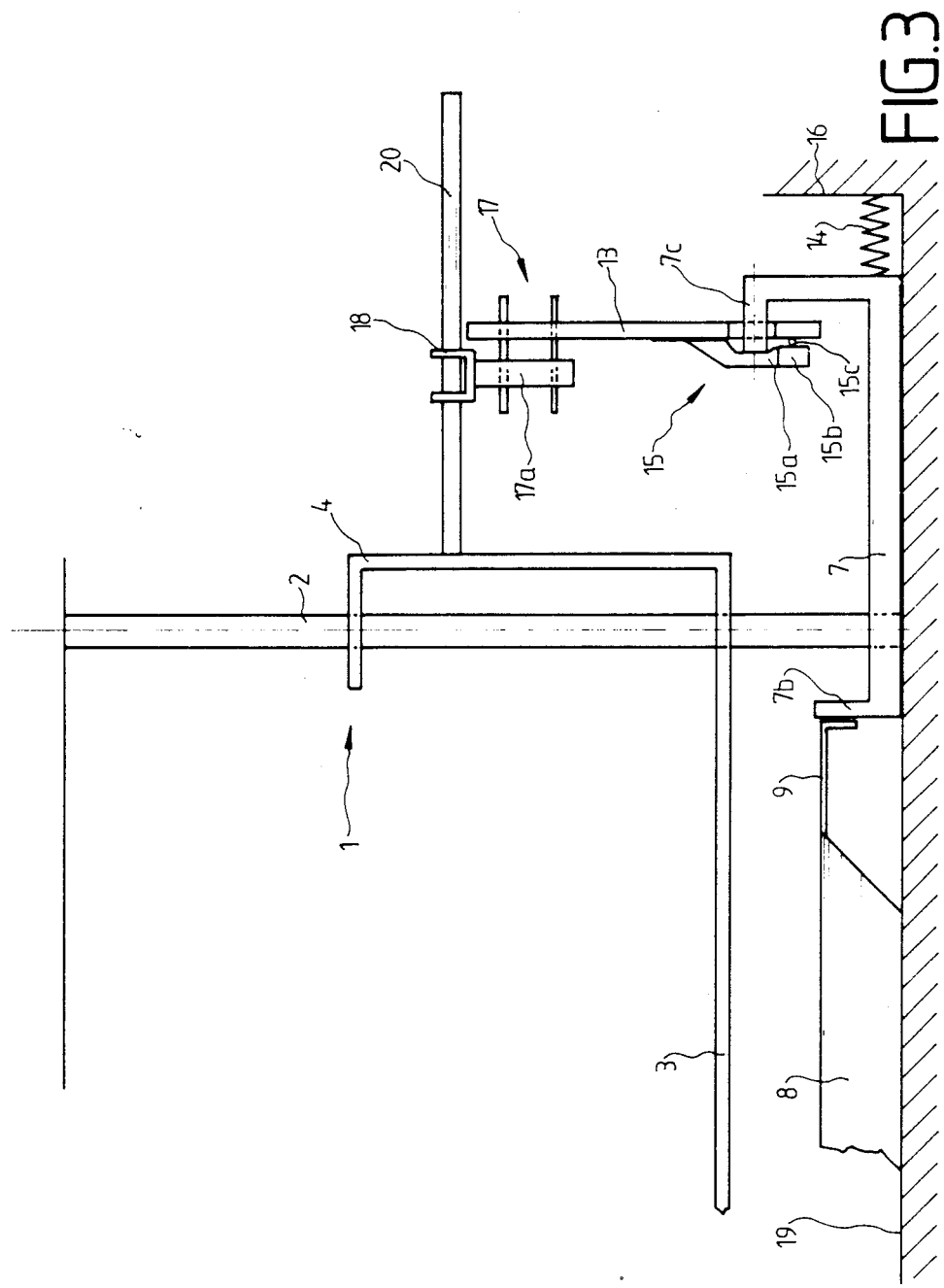
FIG. 3 is a view of a third embodiment of the bread toaster of the invention.

Also in the embodiment of the bread toaster of the invention shown in FIG. 3, the carriage 1 can be held in its operating position by a locking device.

In contrast to the embodiment shown in FIG. 2, the carriage 1 is not locked by mechanical means providing for positive engagement of a hook with a detent nose, but by frictional engagement means using electromagnetic forces.

To this end, the handle portion 20 of the carriage 1 includes a yoke member 18 which in the lowered position of the carriage 1 lies opposite a core 17a of an electromagnet 17 arranged on a printed circuit board 13. The printed circuit board 13 is connected to a source of DC power in a manner not shown in FIG. 3, which is accomplished in that a suitable AC voltage is taken off the heating unit and subsequently rectified. The printed circuit board 13 includes adjacent to the electromagnet 17 a switch 15 having an elastically deformable bow contact 15a with a contact surface 15b at its one end. While the positive terminal of the voltage supply (see FIG. 4) is directly connected to one of the two terminals of the electromagnet 17, the other terminal of the electromagnet 17 is adapted to be connected to the negative terminal of the DC source via the switch 15. For this purpose it is necessary for the contact surface 15b to contact a mating contact surface 15c arranged opposite thereto on the printed circuit board 13. This closes the electrical circuit for the electromagnet 17. By selecting a suitable current and suitably dimensioning the electromagnet 17 in respect of the number of its turns and the type of its core 17a, the electromagnet 17 exerts a force on the yoke member 18 sufficient to lock the carriage 1 in the operating position shown in FIG. 3 against the force of the spring.

Also in the embodiment of FIG. 3, the bread toaster includes a slide member 7 which is displaceable alongside the bottom of its housing, such displacement occurring again along the guideway 2 in horizontal direction against the action of a spring 14. In this embodiment, too, an elbow section 9 formed on the crumb tray 8 cooperates with a single-angled projection 7b formed on the slide member 7. The slide member 7 further includes a double-angled second projection 7c which extends through the printed circuit board 13 from the side opposite the bow contact 15a and cooperates with the bow contact 15a in the manner subsequently described:

In the event that the crumb tray 8 has been removed or is not fully inserted to its end position in the housing, the slide member 7, under the action of the spring 14, slides to the left until the elastically deformable bow contact 15a is unseated to an extent eliminating contact between the contact surface 15b and the mating contact surface 15c. This interrupts the electrical circuit for the electromagnet 17. One consequence thereof is that the carriage 1 cannot be locked in its operating position when the crumb tray 8 is removed or not fully inserted to its end position. As another consequence, the electrical circuit for the electromagnet 17 is also interrupted in the event that the crumb tray 8 is removed from its end position, causing the carriage to move back to its receiving position under spring action, thereby disconnecting the heating unit from its source of power and aborting the toasting cycle.

In this manner it is ensured that the heating unit cannot be energized when the crumb tray 8 is removed or not fully inserted to its end position, and secondly that the toasting cycle is interrupted when the crumb tray 8 leaves its end position.

Figure 4:
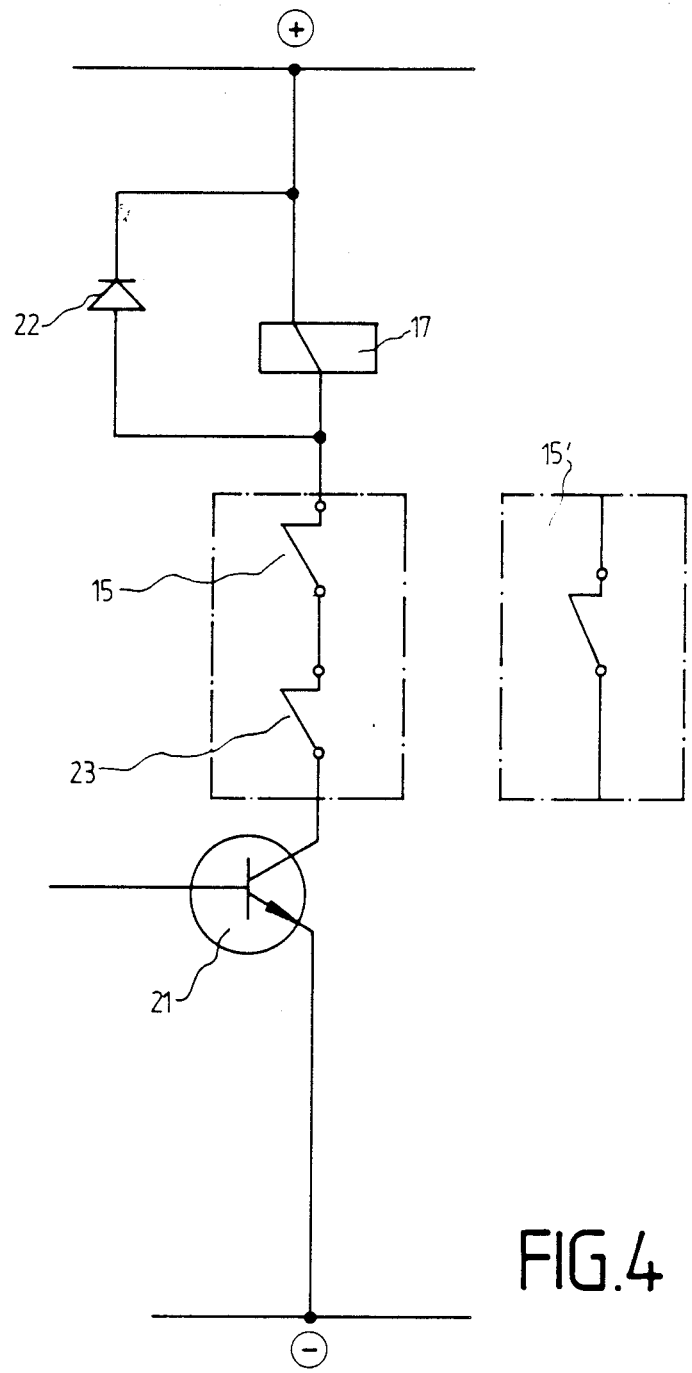
FIG. 4 is a section of the electrical circuit diagram of the bread toaster of FIG. 3.

FIG. 4 shows in partly schematic representation a series circuit configuration comprised of the electromagnet 17, the switch 15, a further switch 23 and an npn transistor 21 which are all connected to a source of DC power generated in the manner previously described. Connected in parallel to the electromagnet 17 is a diode 22 which serves the function of keeping the voltage surge away from in particular the transistor 21, the surge occurring due to the self-induction effect on opening of the electromagnet 17. The switch 23 serves as an "emergency cutout" with which the majority of known bread toasters are conveniently equipped in order to be able to interrupt the toasting cycle at any time. Suitable constructional means make it possible to combine the switch 15 and the switch 23 to a single switch as indicated in FIG. 4 by the box 15'. In such an arrangement, the bow contact 15a can be displaced by the double-angled projection 7c of the slide member, and secondly by a mechanical actuating member not shown in FIG. 4 for an "emergency stop" of the bread toaster. The transistor 21 represents a further switching element capable of disconnecting the electrical supply for the electromagnet 17, which occurs when the toasting cycle is completed in the usual manner, that is, either after a predetermined period of time or when the article has reached a predetermined degree of browning.

While in the embodiment illustrated in FIGS. 3 and 4 the switch 15 merely controls the electromagnet 17, this switch may also be part of an electric control circuit controlling the supply of electrical energy to the heating unit. In such an arrangement it is no longer possible for the heating unit to remain connected to its electrical supply by manually holding down the carriage 1 in its lowermost position until the user releases the handle portion 20 of the bread toaster. Using the switch 15 in this manner has the advantage that under no circumstances can the heating unit of the bread toaster be connected to its electrical supply when the crumb tray 8 is not in its end position.

We claim:

1. An electric bread toaster comprising a housing, structure in said housing defining a toasting chamber, an electric heating unit in said housing, carriage structure in said housing movable between a receiving position and an operating position, a handle portion coupled to said carriage structure, spring structure in said housing for biasing said carriage structure towards said receiving position, guideway structure in said housing and cooperating with said carriage structure for guiding movement of said carriage structure between said receiving position and said operating position, said carriage structure being displaceable by means of said handle portion along said guideway structure and against spring action of said spring structure from said receiving position into said operating position, toast rack structure carried by said carriage structure for downward movement within said toasting chamber, a crumb collecting tray which extends below said toast rack structure and is insertable into an end position in said housing, said carriage structure being required to be brought into its said operating position for energization of said heating unit, a locking mechanism for holding said carriage structure in said operating position for the duration of the toasting cycle, a first device for preventing energization of said heating unit when said crumb collecting tray is not fully inserted to its said end position inside said housing, and a second device for rendering said locking mechanism ineffective on removal of said crumb collecting tray from its said end position, in the event that said carriage structure, following energization of said heating unit, is already in its operating position and said crumb collecting tray is fully inserted to its said end position, whereby said carriage structure moves back to said receiving position under spring action of said spring structure, thereby de-energizing said heating unit and aborting the toasting cycle.

2. An electric bread toaster comprising a housing, structure in said housing defining a toasting chamber, an electric heating unit in said housing, guideway structure in said housing, carriage structure in said housing movable between a receiving position and an operating position, a handle portion coupled to said carriage structure, spring structure in said housing for biasing said carriage structure towards said receiving position, guideway structure in said housing and cooperating with said carriage structure for guiding movement of said carriage structure between said receiving position and said operating position, said carriage structure being displaceable by means of said handle portion along said guideway structure and against spring action of said spring structure from said receiving position into said operating position, toast rack structure carried by said carriage structure for downward movement within said toasting chamber, a crumb collecting tray insertable into an end position in said housing such that said crumb collecting tray extends below said toast rack structure, said carriage structure being required to be brought into its said operating position for energization of said heating unit, a locking mechanism for holding said carriage structure in said operating position for the duration of the toasting cycle, and a device for preventing energization of said heating unit when said crumb collecting tray is not fully inserted to said end position inside said housing, said device including a slide member which cooperates with said crumb collecting tray in such manner that it is moved against the spring biasing force of said spring structure as said crumb collecting tray is being inserted, said slide member being provided with projection structure which blocks movement of said carriage structure to its operating position when said crumb collecting tray is not fully inserted to its said end position.

3. The bread toaster as claimed in claim 2 wherein said projection structure is integrally formed with said slide member, said slide member is guided through said guideway in its movement, and said crumb collecting tray cooperates with said slide member through an elbow section formed thereon.

4. The bread toaster as claimed in claim 1 wherein said first device includes mechanical means for rendering said locking mechanism ineffective, said mechanical means, while enabling said carriage structure to be brought to its said operating position, causing said carriage structure to return to its receiving position under spring action structure on release of said handle portion in the event that said crumb collecting tray has not been inserted to its said end position.

5. The bread toaster as claimed in claim 4 wherein said locking mechanism includes a pivoted lever which is adapted to pivot about a pivot point and parallel to the plane of motion of said carriage structure, said lever having at its one end a hook member and at its other end a trunnion and being exposed to the action of a first spring acting in horizontal direction below said pivot point, said trunnion being carried in an elongated hole and said hook member cooperating with a detent nose provided on a bracket of said carriage structure such that they are in a position to lock said carriage structure in its operating position, and said first device includes a horizontally movable slide member in which said elongated hole is formed and which is movable horizontally by insertion of said crumb collecting tray against the force of a second spring acting intermediate an end wall of the bread toaster and said slide member, with the two opposed spring forces, the location and the dimensions of said elongated hole being relatively coordinated such that, with said crumb collecting tray not inserted to its said end position, said slide member and accordingly also said pivoted lever assume a position in which said hook member is no longer inside the range of action of said detent nose, so that locking of said carriage structure is no longer possible, and with said carriage structure already in its operating position, its locking engagement is released when said crumb collecting tray is removed from its said end position.

6. The bread toaster as claimed in claim 5 wherein said slide member, said second spring and said elongated hole cooperating with said trunnion are also part of said second device which releases the locking engagement of said carriage structure in its operating position when said crumb collecting tray is removed from its said end position.

7. The bread toaster as claimed in claim 1 and further including a switch which is closed only when said crumb collecting tray is fully inserted to its said end position in said housing of the bread toaster, and wherein said locking mechanism includes an electromagnet and a yoke member, said yoke member being connected with said carriage structure and in the operating position of said carriage structure lying opposite said electromagnet, current being supplied to said electromagnet to lock said carriage structure in place due to the magnetic forces occurring between said yoke member and said electromagnet only if said switch is closed.

8. The bread toaster as claimed in claim 7 and further including a spring, and a slide member which forms part of said first and second devices and which is displaceable by said crumb collecting tray against spring force of said spring, said slide member including a first projection which, with said crumb collecting tray not properly inserted, displaces a bow contact of said switch such that a contact surface on said bow contact is no longer in contact with an associated mating contact surface, whereby the supply of electrical energy to said electromagnet is interrupted.

9. The bread toaster as claimed in claim 8 wherein said spring acts between an end wall of the bread toaster and said first projection of said slide member, and said slide member is guided in said guideway and includes a second projection which cooperates with an elbow section formed on said crumb collecting tray.

10. The bread toaster as claimed in claim 7 wherein said switch controls the supply of electrical energy to said electromagnet and to said heating unit.

* * * * *